United States Patent
Benkreira et al.

(10) Patent No.: US 11,328,317 B2
(45) Date of Patent: *May 10, 2022

(54) SYSTEMS AND METHODS FOR INCENTIVIZING BEHAVIOR

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/092,491

(22) Filed: Nov. 9, 2020

(65) Prior Publication Data

US 2021/0056583 A1 Feb. 25, 2021

Related U.S. Application Data

(63) Continuation of application No. 16/387,952, filed on Apr. 18, 2019, now Pat. No. 10,832,273.

(51) Int. Cl.
*G06Q 30/02* (2012.01)
*G06F 21/57* (2013.01)
*G06F 21/46* (2013.01)
*H04L 29/06* (2006.01)

(52) U.S. Cl.
CPC ......... *G06Q 30/0236* (2013.01); *G06F 21/46* (2013.01); *G06F 21/577* (2013.01); *H04L 63/1433* (2013.01)

(58) Field of Classification Search
CPC .. G06Q 30/0236; G06Q 30/0207–0277; G06F 21/46; G06F 21/577; H04L 63/1433; H04L 29/06795; H04L 63/1441
See application file for complete search history.

(56) References Cited

U.S. PATENT DOCUMENTS

| | | |
|---|---|---|
| 6,965,868 B1 | 11/2005 | Bednarek |
| 7,117,528 B1 * | 10/2006 | Hyman ................ H04L 63/08 726/5 |
| 9,349,014 B1 * | 5/2016 | Hubing ................ G06F 21/577 |

(Continued)

FOREIGN PATENT DOCUMENTS

| | | | |
|---|---|---|---|
| CN | 110958243 A * | 4/2020 | |
| WO | 2015/079460 | 6/2015 | |
| WO | WO-2015079460 A1 * | 6/2015 | ......... G06Q 30/0224 |

OTHER PUBLICATIONS

16. A. Vikram, S. Chennuru, H. R. Rao and S. Upadhyaya, "A solution architecture for financial institutions to handle illegal activities : a neural networks approach," 37th Annual Hawaii International Conference on System Sciences, 2004. Proceedings of the, 2004, pp. 181-190. (Year: 2004).*

(Continued)

*Primary Examiner* — Marie P Brady
(74) *Attorney, Agent, or Firm* — DLA Piper LLP (US)

(57) ABSTRACT

A computer-implemented method for incentivizing user behavior including identifying an action for a user to perform, providing the number of credits that can be earned by the user for performing the action, verifying that the user has carried out the action and awarding the credits to the user.

20 Claims, 7 Drawing Sheets

(56) References Cited

U.S. PATENT DOCUMENTS

| | | | | |
|---|---|---|---|---|
| 9,413,780 | B1* | 8/2016 | Kaplan | G06F 21/577 |
| 9,633,201 | B1* | 4/2017 | Katz | G06F 21/552 |
| 2002/0019769 | A1* | 2/2002 | Barritz | G06Q 30/0235 |
| | | | | 705/14.35 |
| 2003/0009385 | A1 | 1/2003 | Tucciarone et al. | |
| 2005/0251408 | A1* | 11/2005 | Swaminathan | G06Q 30/0254 |
| | | | | 705/346 |
| 2006/0205461 | A1* | 9/2006 | LaRocca | G07F 17/3239 |
| | | | | 463/1 |
| 2008/0270240 | A1* | 10/2008 | Chu | G06Q 30/0239 |
| | | | | 705/14.11 |
| 2013/0283336 | A1* | 10/2013 | Macy | G06F 21/577 |
| | | | | 726/1 |
| 2013/0347116 | A1* | 12/2013 | Flores | H04L 63/1433 |
| | | | | 726/25 |
| 2014/0108210 | A1* | 4/2014 | Chelst | G06Q 20/023 |
| | | | | 705/30 |
| 2014/0220927 | A1* | 8/2014 | Girard | H04L 12/1475 |
| | | | | 455/405 |
| 2015/0294339 | A1* | 10/2015 | Vargas | G06Q 20/405 |
| | | | | 705/14.17 |
| 2016/0241561 | A1* | 8/2016 | Bubany | H04L 63/1433 |
| 2018/0167402 | A1* | 6/2018 | Scheidler | G06F 21/554 |
| 2018/0191770 | A1* | 7/2018 | Nachenberg | G06F 21/554 |
| 2019/0303583 | A1* | 10/2019 | Hosking | G06Q 10/0639 |
| 2020/0334705 | A1 | 10/2020 | Benkreira et al. | |

OTHER PUBLICATIONS

The Fortnite Team, "Protect Your Account! Enable 2FA", Epic Games, Inc., Aug. 23, 2018, https://www.epicgames.com/fortnite/en-US/news/2fa, 4 pages.

* cited by examiner

500

600 https://BankName/AccountAccess/12345/AcctAct

Account Number: 12345

Account Holder: John Q. Public

Credit Balance: 85

610

| Account Maintenance Actions | Credits |
| --- | --- |
| Update password | 35 |
| Confirm contact information | 5 |
| Confirm transactions | 1/transaction |
| Upload receipt | 5 |
| Confirm income | 5 |
| Answer survey question | 3 |
| Link social network account | 30 |
| Authorize automatic bill pay | 25 |

*FIG. 6*

SYSTEMS AND METHODS FOR INCENTIVIZING BEHAVIOR

CROSS-REFERENCE TO RELATED APPLICATIONS

This is a continuation of U.S. application Ser. No. 16/387,952, filed Apr. 18, 2019, which is hereby incorporated by reference in its entirety.

BACKGROUND

Institutions offering accounts to consumer and commercial customers face a great deal of financial exposure. For example, retail credit card balances that are written off for non-payment cost card issuers billions of dollars every year. Similarly, hacking of online accounts results in great losses to account holders, insurers, and account institutions. Mitigating this risk can save millions of dollars.

Effective marketing can drive profitable business to an institution. For example, directed advertising based on an account holder's interests and word-of-mouth endorsements through social media can greatly increase a valuable revenue stream.

An institution can attempt to mitigate the risk of financial loss associated with an account holder, and can attempt to target advertising to an account holder. However, such attempts may benefit from active participation by the account holder.

SUMMARY

Embodiments of the present disclosure relate to systems and methods for incentivizing behavior. In addition, embodiments of the present disclosure relate to solutions for incentivizing a user to perform an account maintenance action.

In accordance with some embodiments of the present disclosure, there is provided a computer-implemented method for incentivizing user behavior. The method includes retrieving, by a computer system including a processor, information for an account. The method also includes identifying, by the computer system based on a risk model, marketing model, or customer engagement model, an account maintenance action out of a plurality of possible account maintenance actions for a user to perform on the account. The method further includes identifying, by the computer system, a number of credits that can be earned by the user for performing the account maintenance action. The method still further includes providing, by the computer system, an indication of the account maintenance action for the user to perform and an indication of the number of credits that can be earned by the user for display to the user. The method also includes verifying, by the computer system, that the user has carried out the account maintenance action, and awarding, by the computer system, the number of credits to the user in response to verifying that the user has performed the account maintenance action.

In accordance with aspects of the disclosure, the account maintenance action is one of confirming or updating contact information for the account, confirming or updating information about a holder of the account, confirming or updating income of a holder of the account, confirming a transaction associated with the account, flagging a transaction associated with the account as inaccurate, uploading an image of a receipt of a transaction associated with the account, creating or updating a password, linking the account to a social network account, answering a survey question, or authorizing automatic payment of balances on the account.

In accordance with further aspects of the disclosure, the credits are indicative of one of cash, points that the user is able to redeem for products, services, or gift cards, or points that the user is able to redeem for a membership to a subscription-based service.

In accordance with still further aspects of the disclosure, the account maintenance action includes uploading a receipt of a transaction associated with the account, further including performing, by the computer system, optical character recognition on the receipt to identify individual items and individual item costs making up a transaction, and storing, by the computer system, information about the individual items and the individual item costs associated with the transaction.

In accordance with aspects of the disclosure, the method further includes determining, by the computer system, that a password associated with the account is insecure, and identifying, by the computer system, an action to update the password to a more secure password as the account maintenance action in response to the determination that the password associated with the account is insecure.

In accordance with further aspects of the disclosure, the method further includes determining, by the computer system, that the user has not been engaged regarding the account using stored contact information for the user for a period of time, and identifying, by the computer system, an action to confirm the contact information as the account maintenance action in response to the determination.

In accordance with still further aspects of the disclosure, the indication of the account maintenance action is provided by one of email, push notification, text message, or prompt on a screen displaying account information.

In accordance with aspects of the disclosure, the account is one of a savings account, a credit card account, a checking account, an investment account, or a loan account.

Furthermore, in accordance with some embodiments, there is provided a system for incentivizing user behavior, including a memory storing instructions, and a processor that executes the instructions. The processor, when executing the instructions, is configured to identify, based on a risk model, marketing model, or customer engagement model, an account maintenance action out of a plurality of possible account maintenance actions that can be performed for an account. The processor, when executing the instructions, is further configured to identify a number of credits to offer in exchange for performing the account maintenance action for the account. The processor, when executing the instructions, is still further configured to transmit a prompt to a user associated with the account offering the number of credits in exchange for performing the account maintenance action. The processor, when executing the instructions, is also configured to verify that the user has performed the account maintenance action, and award the number of credits to the user in response to verifying that the user has performed the account maintenance action.

In accordance with aspects of the disclosure, the account maintenance action is identified based on a determination that performance of the account maintenance action would reduce a risk of fraud associated with the account.

In accordance with further aspects of the disclosure, the number of credits that are offered in exchange for performing the account maintenance action is identified based on the degree to which performance of the account maintenance action would reduce the risk of fraud associated with the account.

In accordance with still further aspects of the disclosure, the number of credits that are offered in exchange for performing the account maintenance action is identified based on a value of the account to the institution providing the account.

In accordance with aspects of the disclosure, the account is a first account, and the processor is further configured to retrieve information indicative of a risk of fraud associated with each of the first account and a second account, the risk of fraud associated with the first account being greater than the risk of fraud associated with the second account. The processor is also configured to identify the account maintenance action that can be performed for the first account by determining that performance of the account maintenance action would reduce the risk of fraud associated with the account. The processor is further configured to identify the account maintenance action as an account maintenance action that can be performed for the second account by determining that performance of the account maintenance action would reduce the risk of fraud associated with the second account. The processor is still further configured to identify a first number of credits to offer in exchange for performing the account maintenance action for the first account based on the risk of fraud associated with the first account. The processor is also configured to identify a second number of credits to offer in exchange for performing the account maintenance action for the second account based on the risk of fraud associated with the second account, wherein the first number of credits is greater than the second number of credits as a result of the risk of fraud associated with the first account being greater than the risk of fraud associated with the second account.

In accordance with further aspects of the disclosure, the prompt is a first prompt, the number of credits is a first number of credits, and the processor is further configured to identify that the account maintenance action has not been performed for the account after transmitting the first prompt to the user associated with the account. The processor is also configured to identify a second number of credits to offer in exchange for performing the account maintenance action for the account, the second number of credits being different than the first number of credits. The processor is further configured to transmit a second prompt to the user associated with the account offering the second number of credits in exchange for performing the account maintenance action. The processor is still further configured to verify that the user has performed the account maintenance action after transmitting the second prompt, and award the second number of credits to the user in response to verifying that the user has performed the account maintenance action after transmitting the second prompt.

Further still, in accordance with some embodiments, there is provided a computer-implemented method for incentivizing user behavior. The method includes causing, by a computer system including a processor, information associated with an account and an indicator that credits can be earned for performing account maintenance actions associated with the account, to be displayed to a user on a device. The method also includes receiving, by the computer system, a notification that the indicator has been selected by the user, and causing, by the computer system, a list of account maintenance actions that can be performed by the user and a number of credits that can be earned in association with each of the account maintenance actions, to be displayed to the user on the device. The method further includes receiving, by the computer system, a notification that the user has selected one of the account maintenance actions from the list, and verifying, by the computer system, that the user has performed the account maintenance action. The method still further includes adding, by the computer system, the number of credits associated with the performed account maintenance action to a sum total number of credits the user has earned, and providing, by the computer system, information that causes a graphic to be displayed to the user on the device, the graphic indicating the sum total number of credits the user has earned.

In accordance with aspects of the disclosure, the graphic grows in size as the sum total number of credits the user has earned increases.

In accordance with further aspects of the disclosure, the graphic indicates progress toward a goal the user is working towards, the graphic being partially filled based on the sum total number of credits the user has earned.

In accordance with still further aspects of the disclosure, the list of account maintenance actions is a first list of account maintenance actions, and the method further includes causing, by the computer system, an indication to be displayed to the user on the device indicating that the first list of account maintenance actions will be available for a period of time and that the user can earn a membership to a subscription by completing a portion of the account maintenance actions. The method also includes awarding, by the computer system, the membership to the subscription to the user in response to verifying that the user has completed the portion of the account maintenance actions. The method further includes causing, by the computer system, a second list of account maintenance actions that can be performed by the user and a number of credits that can be earned in association with each of the account maintenance actions in the second list, to be displayed to the user on the device after the period of time has passed. The method still further includes causing, by the computer system, another indication to be displayed to the user on the device indicating that the second list of account maintenance actions will be available for a period of time and that the user can maintain the membership to the subscription by performing a portion of the account maintenance actions in the second list of account maintenance actions.

In accordance with aspects of the disclosure, the method further includes causing, by the computer system, a prompt to be sent to the user, the prompt indicating that a new account maintenance action is available for performance by the user.

In accordance with further aspects of the disclosure, the prompt is one of an email message, text message, push notification, telephone call, or message within an application associated with the institution providing the account.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute a part of this specification, and together with the description, illustrate and serve to explain the principles of various example embodiments.

FIG. 6 is an example illustration of another user interface screen, consistent with embodiments of the present disclosure.

DETAILED DESCRIPTION

Figure 1:
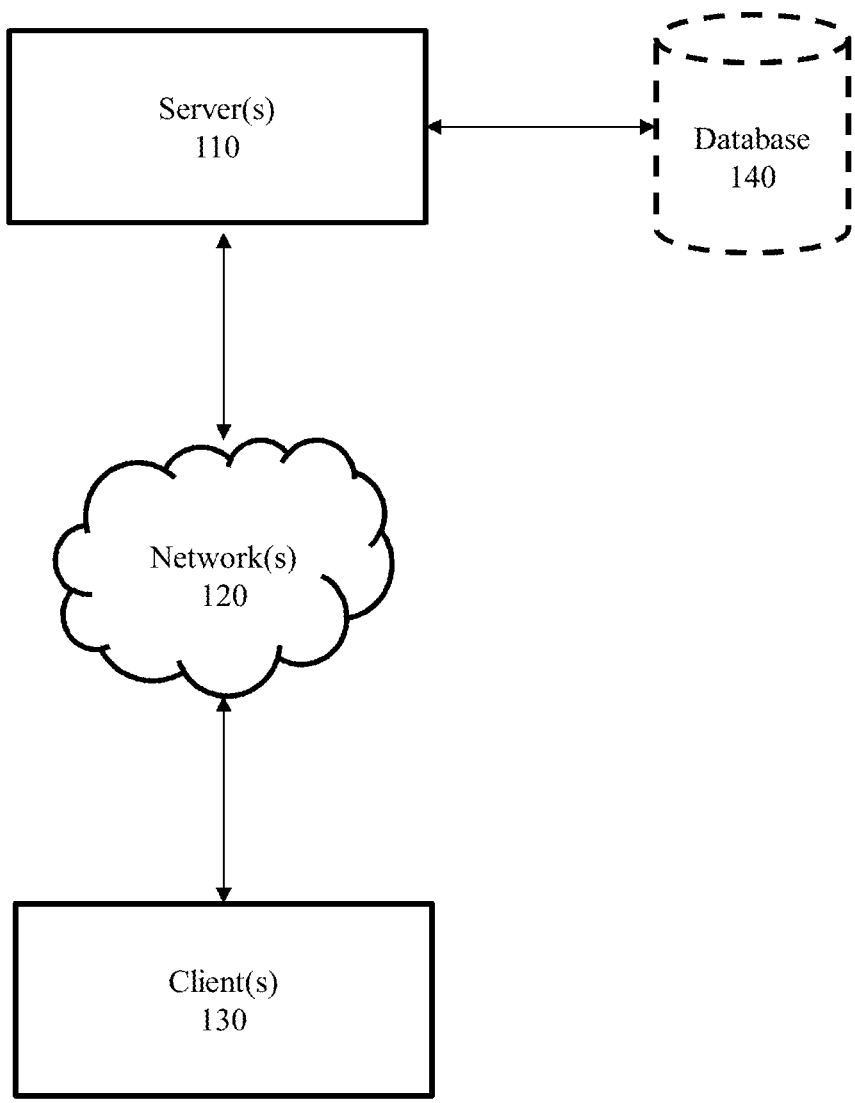
FIG. 1 is an example block diagram of a computing environment, consistent with embodiments of the present disclosure.

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments of the present disclosure relate to systems and methods for incentivizing behavior. In addition, embodiments of the present disclosure relate to solutions for incentivizing a user to perform an account maintenance action.

Institutions offering accounts to consumer and commercial customers face a great deal of financial exposure. For example, retail credit card balances that are written off for non-payment cost card issuers billions of dollars every year. Similarly, hacking of online accounts results in great losses to account holders, insurers, and account institutions. Mitigating this risk can save millions of dollars.

Effective marketing can drive profitable business to an institution. For example, directed advertising based on an account holder's interests and word-of-mouth endorsements through social media can greatly increase a valuable revenue stream.

An institution can attempt to mitigate the risk of financial loss associated with an account holder, and can attempt to target advertising to an account holder. However, such attempts may require active participation by the account holder.

Simple account maintenance actions can help to improve the risk level and marketing positions of institutions offering accounts. Paying off credit accounts, changing login credentials, and updating personal information are short and simple tasks; however, account holders frequently neglect them because there is no clear or immediate value to them.

Embodiments of the present disclosure can improve the risk level and marketing positions of institutions offering accounts. An account may include, for example, any type of account associated with an entity such as a person, a group of persons, or a legal entity (e.g., a corporation). An account could be, for example, an account associated with a financial institution, such as a bank account, a checking account, a savings account, a credit card account, an investment account, or a loan account.

Embodiments of the present disclosure provide systems and methods for incentivizing users to perform account maintenance actions. A user could be, for example, an individual who accesses an account using a client device. A user could be, for example, an account holder or an individual authorized to access an account holder's account. Providing incentives to users to take these actions can help to keep account holder information up-to-date and accurate. With more accurate information, institutions may be better able to target marketing to customers. Providing incentives to perform account maintenance actions can also encourage user engagement with an institution, which can improve the chance a user may notice a suspicious transaction, and which can improve the institution's reputation with the user.

FIG. 1 illustrates a block diagram of an example computing environment 100 for implementing embodiments and features of the present disclosure. The arrangement and number of components in environment 100 is provided for purposes of illustration. Additional arrangements, numbers of components, and other modifications can be made, consistent with embodiments of the present disclosure.

As shown in FIG. 1, computing environment 100 may include client devices, such as client device 130, connected to one or more servers 110 over one or more networks 120. Server(s) 110 may include one or more databases 140, or may be connected to one or more databases 140 over one or more networks.

In some embodiments, computing environment 100 may include one or more client devices. The example provided in computing environment 100 illustrates one client device 130; however, the disclosure is not so limited. A client device, such as client device 130, could be a mobile phone, a smart phone, a tablet, a netbook, an electronic reader, a personal digital assistant (PDA), a personal computer, a laptop computer, a smart watch, a gaming device, a desktop computer, a set-top box, a smart television, a personal organizer, a portable electronic device, a smart appliance, a navigation device, or another type of computing device. In some embodiments, a client device may be implemented with hardware devices, software applications running on the hardware devices, or both. A user may use a client device to communicate with server(s) 110 over network(s) 120. A client device may communicate by transmitting data to or receiving data from server(s) 110. In some embodiments, one or more client device(s) 130 may be implemented using a computer system, such as computer system 700 of FIG. 7.

Computing environment 100 may also include one or more servers 110. By way of example, server(s) 110 may include any combination of one or more of web servers, mainframe computers, general-purpose computers, personal computers, or other types of computing devices. In some embodiments, one or more of server(s) 110 may be configured to host a web page, implement a search engine, implement a risk data model, implement a fraud data model, provide an online bill pay center, index information, store information (e.g., bank account information), retrieve information, or some combination of these functions. In some embodiments, a server 110 may be a standalone computing system or apparatus, or it may be part of a larger system. For example, server(s) 110 may represent distributed servers that are remotely located and communicate over a communications network, or over a dedicated network such as a local area network (LAN). Server(s) 110 may include one or more back-end servers for carrying out one or more aspects of the present disclosure.

Server(s) 110 may be implemented as a server system including a plurality of servers, or a server farm including a load balancing system and a plurality of servers. In some embodiments, a server 110 may be implemented with one or more hardware devices, software applications running on the one or more hardware devices, or both. A server 110 may communicate with client devices, such as client device(s) 130, over network(s) 120, and may also communicate with one or more databases 140 over one or more networks. For example, a server 110 may communicate by transmitting data to or receiving data from client devices or databases or both. In some embodiments, one or more of server(s) 110 may be implemented using a computer system, such as computer system 700 of FIG. 7.

In some embodiments, computing environment 100 may also include one or more databases 140. A database may be a part of a server 110, or may be connected with a server 110 over one or more networks. Database(s) 140 may include any combination of one or more types of databases, such as hierarchical databases, network databases, relational databases, or object-oriented databases. A database may store information related to an account, such as the account holder's name, account number, account balance, mailing address, email address, telephone number, credit limit, and/or any other type of information related to a person's bank account. This information may, for example, be stored in a record associated with the account holder. A database may store a large collection of records associated with a number of accounts. A database may be searchable, such that a server 110 or client device can execute a query against the database to retrieve records or information associated with accounts. In response to such a query, a server 110 or client device may receive a list of one or more records or results that may match the submitted query. A database 120 may be implemented in software, or in a combination of software and hardware. One or more databases 140 may also store information relating to one or more risk and/or fraud data models. For example, database(s) 140 may store information identifying when an account holder has last updated contact information or an account password, a security level of an account password, a credit line of an account, whether an account has missed payments in the past, or other bank account information that may be useful in implementing a risk or fraud data model.

In some embodiments, database(s) 140 may be included within server(s) 110, or may be connected to server(s) 110 over one or more networks. A network may provide for the exchange of information, such as queries for information and results, between server(s) 110 and database(s) 140. A network may include one or more wide area networks (WANs), metropolitan area networks (MANs), local area networks (LANs), personal area networks (PANs), or any combination of these networks. A network may include a combination of one or more types of networks, such as Internet, intranet, Ethernet, twisted-pair, coaxial cable, fiber optic, cellular, satellite, IEEE 802.11, terrestrial, or other types of wired or wireless networks. In some embodiments, one or more of databases 140 may be implemented using a computer system, such as computer system 700 of FIG. 7.

Computing environment 100 may also include one or more networks 120. Network(s) 120 may connect server(s) 110 with client devices, such as client device 130. Network(s) 120 may provide for the exchange of information, such as queries for information and results, between client devices and servers 110. Network(s) 120 may include one or more types of networks interconnecting client devices with server(s) 110. For example, one client device, such as client device 130, may communicate with server(s) 110 using a different type of network than a second client device.

In some embodiments, network(s) 120 may include one or more wide area networks (WANs), metropolitan area networks (MANs), local area networks (LANs), personal area networks (PANs), or any combination of these networks. Network(s) 120 may include a combination of one or more types of networks, such as Internet, intranet, Ethernet, twisted-pair, coaxial cable, fiber optic, cellular, satellite, IEEE 802.11, terrestrial, or other types of wired or wireless networks.

Figure 2:
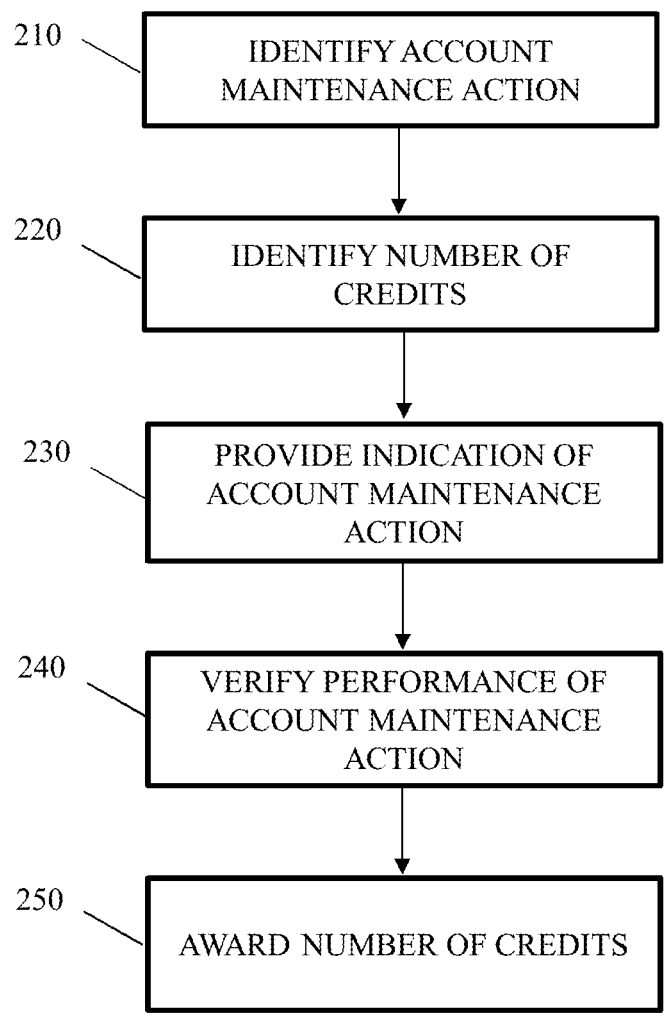
FIG. 2 is an example flow diagram of a method for incentivizing behavior, consistent with embodiments of the present disclosure.

FIG. 2 illustrates a flowchart of an example method 200 for incentivizing behavior, consistent with embodiments of the present disclosure. Example method 200 may be implemented in a computing environment (see, e.g., FIG. 1) using one or more computer systems (see, e.g., FIG. 7). In some embodiments, method 200 may be performed by one or more servers 110.

In step 210, one or more account maintenance actions for a user to perform on an account can be identified. The one or more account maintenance actions may be identified by one or more servers 110 based on information in one or more databases 140. The one or more account maintenance actions may include, for example, one or more of an action to confirm or update contact information (e.g., phone number, mailing address, email address) for the account, an action to confirm or update information about a holder of the account (e.g., a name of the account holder, a social security number of the account holder, a date of birth of the account holder, an age of the account holder), an action to confirm or update an income of a holder of the account, an action to confirm or update an amount of assets or liabilities of a holder of the account, an action to confirm one or more transactions (e.g., deposits or withdrawals) associated with the account as being accurate or inaccurate, an action to flag one or more transactions (e.g., deposits or withdrawals) associated with the account as being potentially fraudulent, an action to upload an image of a receipt of a transaction associated with the account, an action to create or update a password, an action to link the account to a social network account, an action to answer one or more survey questions, an action to authorize automatic payment of balances on the account, or any other type of action that might help an institution in maintaining the account. In some embodiments, the one or more account maintenance actions may be identified out of a plurality of possible account maintenance actions based on how valuable the account maintenance action is to the institution. The value of the account maintenance action may be determined, for example, based on one or more machine learning and/or neural network models trained on historical data, as further described herein.

In step 220, the one or more servers may also identify a number of credits associated with one or more of the identified account maintenance actions. A credit may be, for example, a monetary amount, a reward, or a point used towards earning a reward. For example, a number of credits could be stored in database(s) 140 in association with an account maintenance action. Alternatively, server(s) 110 may implement an algorithm for determining a number of credits to offer for performing one or more account maintenance actions. For example, server(s) may determine to offer a greater number of credits (e.g., $5) for updating a password that has not been updated for a longer period of time (e.g., 2 years) than the number of credits offered (e.g., $1) for updating a password that has not been updated in a shorter period of time (e.g., 6 months).

In some embodiments, in step 230, an indication regarding one or more account maintenance actions may be provided to the user. For example, server(s) 110 may transmit information to a client device that causes the client device to display the indication of the one or more account maintenance actions to the user.

In some embodiments, the information transmitted to the client device could cause a webpage or application that is open when a viewer is viewing account information on the client device to display the indication. For example, a user may use a client device (e.g., client device 130) to access information about a user's bank account from server(s) 110 over network(s) 120. The user could use a client device to access a website hosted by server(s) 110 that provides information about the user's bank account. Alternatively, a user could access information about the user's bank account using a software application installed on a client device. Either the website or the software application may present user interface screens to the user, such that the user can select various options relating to the user's bank account. Before being granted permission to view the bank account information, a user may be required to submit access credentials. For example, a user may be required to submit a username and password. Once the correct access credentials have been submitted, server(s) 110 may provide the client device with information relating to the user's bank account. Once the user has logged in and is viewing the account information, an indication may be displayed to the user. The indication provided to the client device may indicate one or more account maintenance actions that can be performed. The indication may also indicate a number of credits offered as a reward for performing each of the account maintenance actions.

Alternatively, an indication of one or more account maintenance actions could also be transmitted from a server 110 to a client device 130 without regard to whether a user had logged into the account or was viewing account information. For example, the indication may be transmitted as a push notification, text message, e-mail, or automated telephone call. The indication of the one or more account maintenance actions provided to the client device may indicate not only the one or more account maintenance actions to be performed, but also the number of credits offered as a reward for performing each of the account maintenance actions. The indication could be, for example, an indication such as example indication 500 illustrated in FIG. 5.

In some embodiments, an indication could be transmitted to a client device whenever a new account maintenance action is identified for an account. For example, if an account maintenance action is identified that has not previously been presented to a user associated with the account, server(s) 110 may transmit a prompt to the user indicating that the new account maintenance action is available for performance by the user. In some embodiments, server(s) 110 may retrieve contact information for a user, and transmit the prompt based on the contact information, such as via email, telephone call, text message, push notification, or automated telephone call.

In step 240, performance of the one or more account maintenance actions may be verified. For example, server(s) 110 may determine whether a user has logged into the account and performed one or more of the account maintenances actions indicated in step 220. Alternatively, server(s) 110 may access database(s) 140 to determine whether information associated with one of the account maintenance actions has been updated.

If the one or more account maintenance actions have been performed, then in step 250 the number of credits associated with each of the performed account maintenance actions may be awarded. For example, server(s) 110 may determine that a user has performed one or more of the account maintenance actions (e.g., updated a password) indicated in step 230, and may award the number of credits associated with each of the performed account maintenance actions to the account. The number of credits may be a monetary amount, in which case the monetary amount (e.g., $5) may be deposited to the account. Alternatively, the number of credits could be points earned toward a reward. For example, a number of points could be accumulated over time, and then a user could select to exchange a number of points for a certain reward, such as a gift card or a product. In some embodiments, the number of credits could be points that can be used toward a subscription service. For example, if an account holder earns a certain number of points, they could be rewarded with a free month of a subscription-based service, such as a subscription-based video or audio streaming service.

Figure 3:
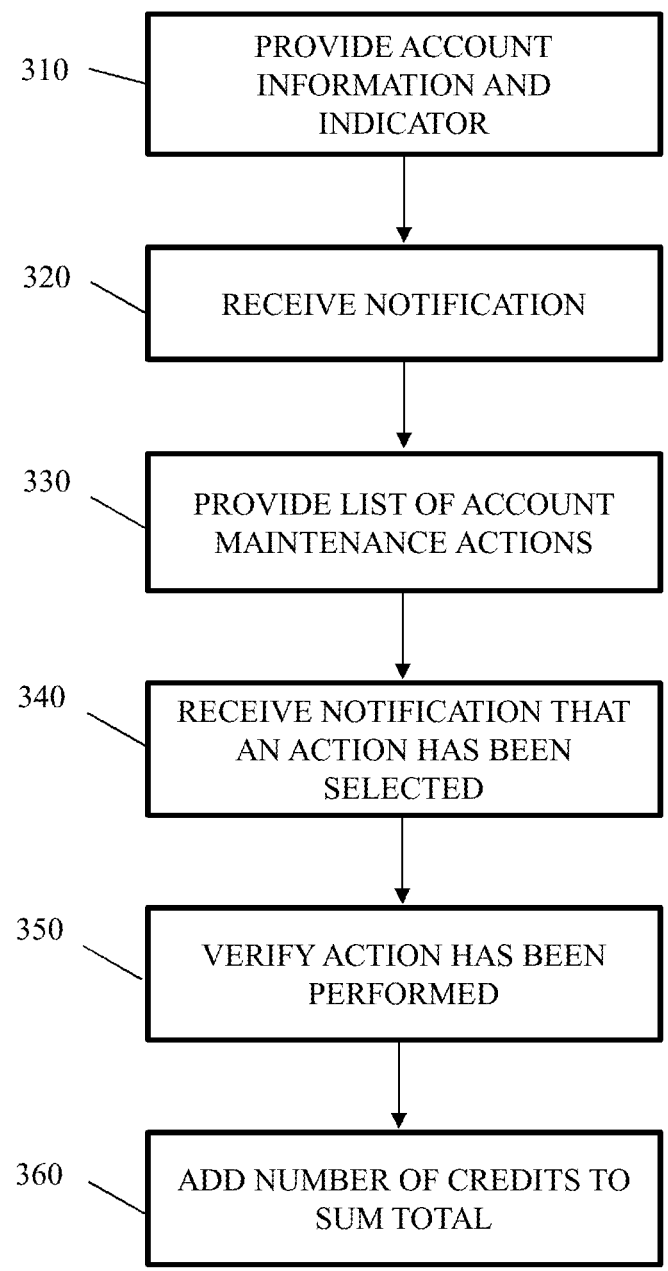
FIG. 3 is an example flow diagram of still another method for incentivizing behavior, consistent with embodiments of the present disclosure.

FIG. 3 illustrates a flowchart of another example method 300 for incentivizing behavior, consistent with embodiments of the present disclosure. Example method 300 may be implemented in a computing environment (see, e.g., FIG. 1) using one or more computer systems (see, e.g., FIG. 7). In some embodiments, method 300 may be performed by one or more servers 110.

In step 310, account information may be provided to a user. For example, a user may use a client device (e.g., client device 130) to access information about the user's bank account from server(s) 110 over network(s) 120. The user could use a client device to access a website hosted by server(s) 110 that provides information about the user's bank account. Alternatively, a user could access information about the user's bank account using a software application installed on a client device. Either the website or the software application may present user interface screens to the user, such that the user can select various options relating to the user's bank account. Before being granted permission to view the bank account information, the user may be required to submit access credentials. For example, the user may be required to submit a username and password. Once the correct access credentials have been submitted, server(s) 110 may provide the client device with information relating to the user's bank account. Once the user has logged in, the account information may be provided to the user. An indicator may also be provided to the user. The indicator may indicate that there are account maintenance actions that can be performed. The indicator may also indicate that the user can earn credits by performing account maintenance actions. In some embodiments, the indicator may be an icon or graphic that can be selected by the user to view a list of one or more account maintenance actions that can be performed. The icon could be, for example, an icon such as example icon 410 illustrated in FIG. 4.

In some embodiments, in step 320, a notification may be received. For example, server(s) 110 may receive a notification indicating that the indicator has been selected by the user on the client device. In response to receiving the notification, server(s) 110 may in step 330 provide a list of account maintenance actions to the client device for display to the user. If the user is logged into the account through a website or application, the list may be provided for display as part of that website or application. If the user is not logged into the account through a website or application, the list may be provided by email, text message, or push notification, for example. In some embodiments the list of account maintenance actions may include a list of one or more account maintenance actions that can be performed by a user for credits. The list may include any combination of one or more account maintenance actions, which may include, for example, an action to confirm or update contact information (e.g., phone number, mailing address, email address) for the account, an action to confirm or update information about a holder of the account (e.g., name of the account holder, a social security number of the account holder, a date of birth of the account holder, an age of the account holder), an action to confirm or update an income of a holder of the account, an action to confirm or update an amount of assets or liabilities of a holder of the account, an action to confirm one or more transactions (e.g., deposits or withdrawals) associated with the account as being accurate or inaccurate, an action to flag one or more transactions (e.g., deposits or withdrawals) associated with the account as being potentially fraudulent, an action to upload an image of a receipt of a transaction associated with the account, an action to create or update a password, an action to link the account to a social network account, an action to answer one or more survey questions, an action to authorize automatic payment of balances on the account, or any other type of action that might help an institution in maintaining the account. In some embodiments, the list may also display an amount of credits that may be earned for performing each of the account maintenance actions. The amount of credits offered may differ for different account maintenance actions. For example, a greater number of credits may be offered for updating a password associated with the account than for confirming whether a transaction associated with the account is accurate. The list of transactions could be, for example, a list such as example list 610 illustrated in FIG. 6.

In step 340, a notification that an account maintenance action has been selected may be received. For example, server(s) 110 may receive a notification that one of the account maintenance actions in the list has been selected by the user on the client device.

In some embodiments, in response to receiving a notification that one of the account maintenance actions in the list has been selected, server(s) 110 may provide one or more webpages, wizards, or other user interface screens with screen prompts and graphical elements to assist the user in performing the account maintenance action. For example, if the user selected an account maintenance action to confirm or update contact information, server(s) 110 may provide information to the client device to present the user with the current contact information on record in database(s) 140, and with prompts to confirm or change the contact information. If the user selected an account maintenance action to confirm or update information about a holder of the account, server(s) 110 may provide information to the client device to present the user with the current information about the account holder on record in database(s) 140, and with prompts to confirm or change the information. If the user selected an account maintenance action to confirm or update an income of a holder of the account, server(s) 110 may provide information to the client device to present the user with the current income information for the account holder on record in database(s) 140, and with prompts to confirm or change the income information. If the user selected an account maintenance action to confirm or update an amount of assets or liabilities of a holder of the account, server(s) 110 may provide information to the client device to present the user with the current amount of assets or liabilities for the account holder on record in database(s) 140, and with prompts to confirm or change the amount.

If the user selected an account maintenance action to confirm one or more transactions (e.g., deposits or withdrawals) associated with the account as being accurate or inaccurate, server(s) 110 may provide information to the client device to cause display of a list of transactions with prompts to indicate whether certain of the transactions, or each of the transactions, is accurate or inaccurate. For example, server(s) 110 may provide information that causes a list of transactions to be displayed, and a radio button to be displayed alongside each transaction. The user could select the radio button to indicate whether the transaction was accurate or inaccurate. In some embodiments, the list of transactions may include transactions actually performed by the account holder as well as fake transactions. Server(s) 110 could then determine whether the user is actively considering each transaction based on whether the user correctly identifies the fake transactions as inaccurate.

If the user selected an account maintenance action to flag one or more transactions as being potentially fraudulent, server(s) 110 may provide information to the client device to cause display of a list of transactions with prompts to indicate whether certain of the transactions, or each of the transactions, is potentially fraudulent. For example, server(s) 110 may provide information that causes a list of transactions to be displayed, and a radio button to be displayed alongside each transaction. The user could review each of the transactions, and select the radio button for each of the transactions the user does not recognize and that therefore could be fraudulent.

If the user selected an account maintenance action to upload an image of a receipt of a transaction associated with the account, server(s) 110 may provide information that triggers a user interface on the client device for capturing a receipt for transfer to server(s) 110. For example, if the client device has a camera, the information may trigger the camera functionality on the client device so that the user may capture a photograph of a receipt for upload to server(s) 110. The client device can then send this photograph to server(s) 110. If the client device is connected to a scanner, the information may trigger scanner functionality on the client device so that a user can scan a receipt for upload to server(s) 110. Prompts could also be provided to assist a user in uploading email or other image file receipts already stored on client device to server(s) 110.

If the user selected an account maintenance action to create or update a password, server(s) 110 may provide information that causes the client device to display prompts for creating or updating the password. The prompts could include information about the requirements for a password. The user interface displayed on the client device could also have a color indicator that changes color as the user enters the password to indicate whether the password is a weak password (e.g., indicated with red), a password of medium strength (e.g., indicated with yellow), or strong password (e.g., indicated with green). In some embodiments, server(s) 110 may offer more credits if the user creates or updates a password to a strong password than if the user creates or updates a password to a weak password. In some embodiments, server(s) 110 may offer to only award credits if the user creates or updates a password to a password having at least a threshold strength.

If the user selected an account maintenance action to link the account to a social network account, server(s) 110 may provide information that causes the client device to display prompts to the user for identifying the social network with which the user has an account, and for receiving the user's username and password for that account in order to link the social network account. If the user selected an account maintenance action to authorize automatic payment of balances on the account, server(s) 110 may provide information that causes the client device to display prompts to the user for identifying a bank with which the user has an account, and for receiving the user's routing number and account number for automatically withdrawing from that bank account.

In step 350, performance of the selected account maintenance action may be verified. For example, server(s) 110 may determine whether a user has performed the account maintenance action by determining whether the user has responded to a series of prompts associated with the account maintenance action. Alternatively, server(s) 110 may access database(s) 140 to determine whether information associated with one of the account maintenance actions has been updated. In some embodiments, server(s) 110 could verify that information that has been updated in association with one of the account maintenance actions is accurate. For example, server(s) 110 may confirm that they are able to connect to the user's social network account (e.g., using the user's username and password), or may confirm that an updated telephone number is valid (e.g., by attempting to contact the user at the updated telephone number).

If the account maintenance action has been performed, then in step 360 the number of credits associated with the performed account maintenance action may be awarded. For example, server(s) 110 may determine that a user has performed the account maintenance action (e.g., updated a password), and may award the number of credits associated with the performed account maintenance action to the account. The number of credits may be a monetary amount, in which case the monetary amount (e.g., $5) may be deposited to the account. Alternatively, the number of credits could be points earned toward a reward. For example, a number of points could be accumulated over time, and then a user could select to exchange a number of points for a certain reward, such as a gift card or a product. In some embodiments, the number of credits could be points that can be used toward a subscription service. For example, if an account holder earns a certain number of points, they can be rewarded with a free month of a subscription-based service, such as a subscription-based video or audio streaming service.

The number of credits awarded could be added to a sum total number of credits the account holder has earned. For example, if the sum total of credits the account holder has earned is 85 (see, e.g., FIG. 4), and then a user associated with the account performs an account maintenance action to confirm contact information and earns 5 credits (see, e.g., FIG. 6), the sum total of credits earned may be updated to 90.

In some embodiments, server(s) 110 may provide information that causes the sum total of credits earned to be displayed as a graphic on the client device to the user. For example, the graphic could be a graphic illustrating a pile of cash, and information provided by server(s) 110 could cause the graphic to grow in size as more credits are earned and added to the total balance of credits. Alternatively, the number of credits earned could be displayed as a number toward a goal the account holder is working towards. For example, if the account holder has earned 85 credits, and 100 credits are required to earn a month's subscription to a streaming movie service, the sum total of credits earned can be displayed as a partially filled progress bar, with more of the progress bar being filled as more credits are earned until 100 credits are earned, at which point the bar may be displayed as completely filled. If an account holder uses some of the earned credits to receive a reward, the amount of credits used may be removed from the sum total number of credits earned. As a result, the graphic illustrating the sum total number of credits may be correspondingly decreased in size, or the portion of the progress bar that is filled may be correspondingly reduced.

In some embodiments, a prompt could be transmitted to a client device whenever a new account maintenance action is identified for an account. For example, if an account maintenance action is identified that has not previously been presented to a user associated with the account, server(s) 110 may transmit a prompt to the user indicating that the new account maintenance action is available for performance by the user. In some embodiments, server(s) 110 may retrieve contact information for a user, and transmit the prompt based on the contact information, such as via email, telephone call, text message, push notification, or automated telephone call.

Figure 4:
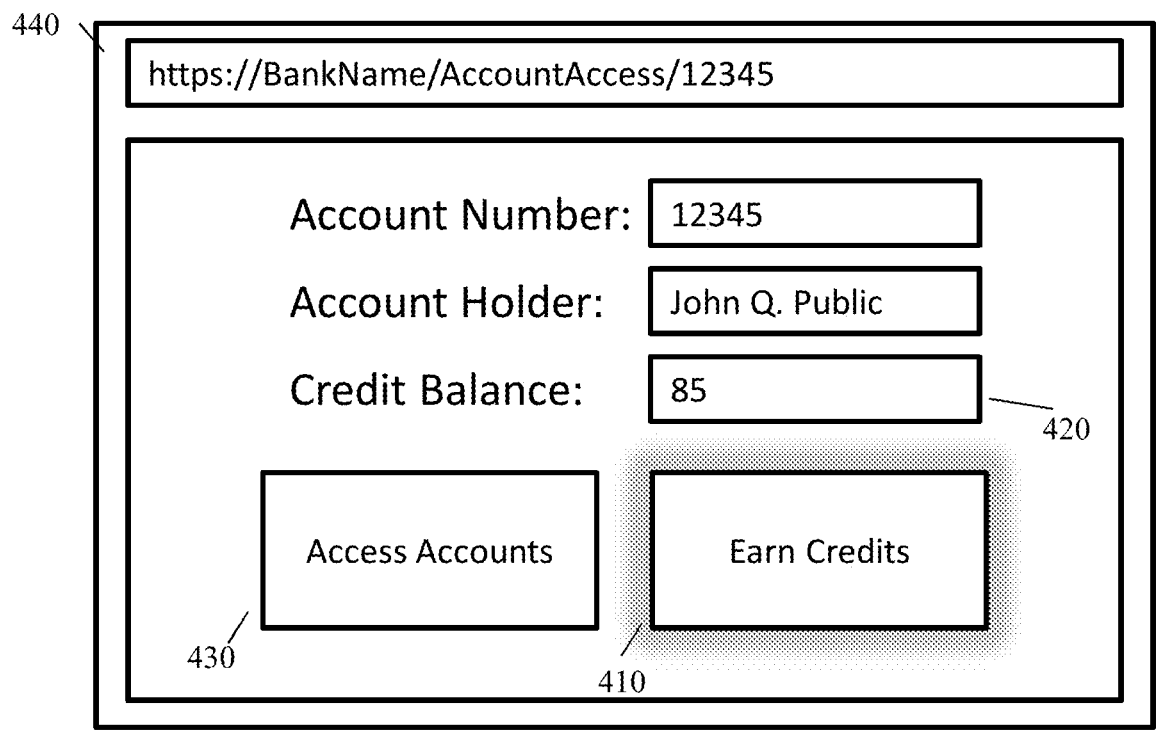
FIG. 4 is an example illustration of a user interface screen, consistent with embodiments of the present disclosure.

FIG. 4 illustrates an example screen 400 of a web browser displaying a webpage on a client device to a user after the user has logged into an account, consistent with embodiments of the present disclosure. The web browser may display the address 440 of the webpage and information about the account, such as an account number and a name of an account holder. The webpage can include a link 430 that the user may select to access account information, a link 410 that the user may select to be taken to a list of account maintenance actions the user may perform to earn credits, and an indication 420 of a current total balance of credits earned. Screen 400 is provided as one example of screen that may be shown to a user on a client device upon logging into an account. One of skill in the art would recognize that a variety of different screens could be displayed, include a variety of different types of indicators, graphics, and other user interface elements.

Figure 5:
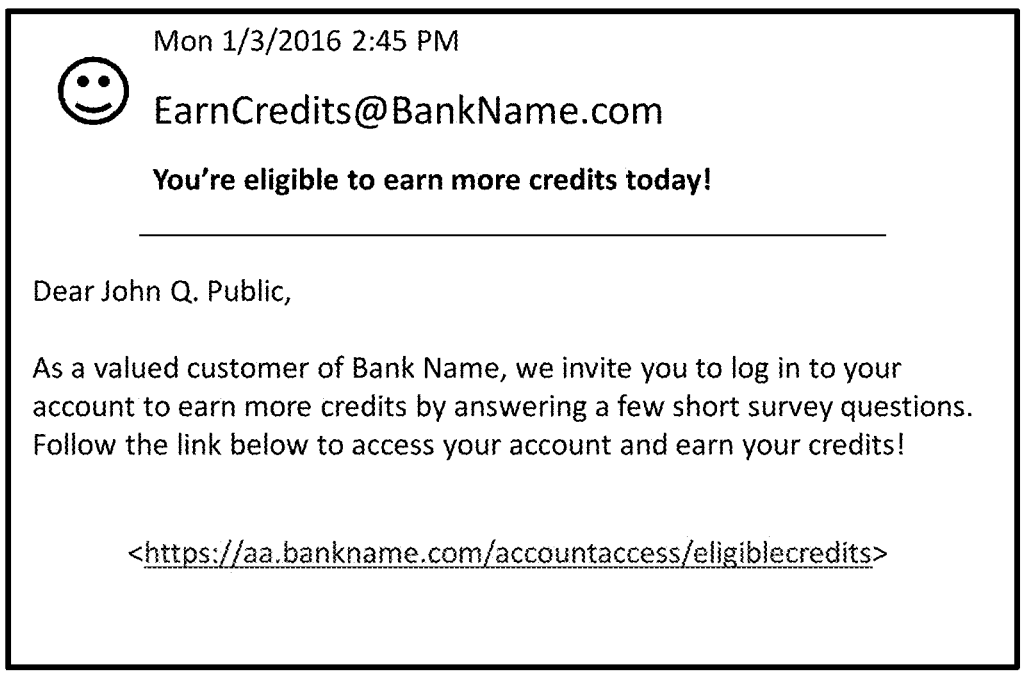
FIG. 5 is an example illustration of a notification, consistent with embodiments of the present disclosure.

FIG. 5 illustrates an example of an indication 500 that may be provided to a client device to indicate to a user that credits can be earned by performing certain account maintenance actions. Indication 500 may be provided, for example, as an email, text message, or push notification. Indication 500 is provided as only one example of an indication. One of skill in the art would recognize that an indication could take a variety of different forms and could include any information that would notify a user about the ability to earn credits by performing account maintenance actions, in accordance in the disclosure herein.

FIG. 6 illustrates an example screen 600 of a web browser displaying a webpage on a client device to a user after the user has logged into an account and selected to perform account maintenance actions. Screen 600 may be displayed, for example, after the user selects link 410 in screen 400 of FIG. 4. Screen 600 displays an address of the webpage, account information for the account holder, such as the account number and the name of the account holder, and an indicator of the total balance of credits earned by the account holder. Screen 600 may also display a list of account maintenance actions that may be performed by the user, each of which may be associated with a number of credits that may be earned for the account maintenance action. The number of credits that may be earned may vary among the account maintenance actions. For example, more credits may be earned for performing an action to update a password (e.g., 35 credits) than for performing an action for confirming income (e.g., 5 credits). Screen 600 is provided as one example of a screen that may be shown to a user on a client device upon logging into an account. One of skill in the art would recognize that a variety of different screens could be displayed, include a variety of different types of indicators, graphics, and other user interface elements.

In some embodiments, server(s) 110 can implement a number of algorithms and rules in software for determining which account maintenance actions to present to a user as actions that can be performed to earn credits. The account maintenance actions presented to a user could be account maintenance actions most likely to benefit the institution providing the account. For example, the account maintenance actions could be actions most likely to reduce a risk of fraud associated with the account. An institution may wish, for example, that its customers use secure passwords and update their passwords every six months. If their customers were to do so, the risk that individuals wishing to commit fraud could guess their passwords, or identify their passwords based on usage on other websites, would be mitigated. However, without an incentive to do so, customers may be reluctant to take the time to update their passwords.

As a result, the institution might program server(s) 110 to recognize, for example, that a password associated with an account is particularly insecure (e.g., the account holder's birthdate), or has not been updated for over a threshold period of time (e.g., 1 year). In response, updating the password associated with the account could be identified as an account maintenance action to present to the user, along with a number of credits that could be earned for performing the account maintenance action. By incentivizing a user with an offer of a number of credits, the user may take an action that benefits the risk model of the institution.

Other account maintenance actions could also reduce the level of risk to an institution associated with a particular account. For example, an institution may also want to confirm the income, or a level of assets and/or liabilities, of an account holder from time to time, to determine, for example, whether to raise or lower a line of credit. It could also be beneficial to an institution if a user were to look at past transactions from time to time to identify potentially fraudulent transactions. An institution could incentivize customers to take these actions by identifying them as account maintenance actions for which credits may be earned.

As one additional example, an institution may wish to keep contact information for its customers up-to-date, so that the customers can be contacted if potentially fraudulent transactions are detected. Accordingly, the institution may program server(s) 110 to recognize, for example, that an account holder has not been reached using the contact information on record for at least a certain period of time (e.g., 1 year), and that the contact information has not been updated within a certain period of time (e.g., 1 year). In response to this recognition, server(s) 110 could present a user associated with the account with an account maintenance action to update or confirm the contact information of record, along with an offer to earn a number of credits if the user takes that action.

Other account maintenance actions may also reduce the amount of risk to an institution associated with a particular account. For example, an institution can learn more about a customer's identity if that customer links their social network accounts with the institution offering the account. If a customer is willing to share this more detailed information about their identity, that customer is less likely to be a customer looking to commit fraud on the institution. Accordingly, linking a social network account may be offered to users as an account maintenance action. An institution may also benefit when customers authorize automatic payment of their account balances. Doing so might increase the chance that balances on credit lines offered by the institution are paid by the customer. Accordingly, authorizing automatic payment of balances may be offered to users as an account maintenance action.

Server(s) 110 can also implement a number of algorithms and rules in software for determining how many credits to award for certain account maintenance actions. For example, more credits might be offered for an account maintenance action (e.g., update a password) that has a greater impact on reducing the risk of fraud to the institution than another account maintenance action (e.g., confirm a transaction). More credits might also be offered for an account maintenance action that is more of a burden to a user (e.g., update a password) than another account maintenance action (e.g., confirm a transaction).

Institutions might also offer account maintenance actions that might benefit the institution in ways beyond reducing fraud. For example, it could be useful to receive receipts of transactions made by a user. If a user purchases a number of items from a store (e.g., 25 items), the institution might only see the sum total amount of the transaction, and not know the items the customer actually purchased. If a user uploads a receipt of the transaction, server(s) 110 can perform optical character recognition (OCR) on the receipt to identify the line item transactions that make up the transaction. This line item transaction data can then be stored, and used for presentation to the user and/or for targeting information such as advertising to the user.

Institutions might also want to adjust the number of credits offered for performing account maintenance actions based on the value of the account to the institution. For example, accounts with high credit lines or high account balances might be offered a greater number of credits for performing an action than accounts with lower credit lines or lower account balances.

Presenting account maintenance actions can also generally benefit the institution by keeping the customer engaged. Customer engagement may help build a relationship with the customer, and improve customer satisfaction. An engaged customer might also identify potentially fraudulent transactions more readily, and identify them for the institution so that steps can be taken to avert future fraudulent transactions.

The rules and algorithms implemented on server(s) 110 could be run across a number of accounts for an institution. The rules and algorithms could identify different risks for different accounts and adjust the incentives accordingly. For example, server(s) 110 could retrieve information indicative of a risk of fraud associated with each of a first account and a second account. The first account could be associated with an account holder that does not readily log into his/her account or update his/her account information. The second account could be associated with an account holder that readily logs into his/her account and is diligent in updating his/her account information. Server(s) 110 may accordingly identify a risk of fraud associated with the first account as being greater than a risk of fraud associated with the second account. Server(s) 110 may identify an account maintenance action that can reduce the risk of fraud associated with the first account, and an account maintenance action that can reduce the risk of fraud associated with the second account.

Server(s) 110 can identify a first number of credits to offer to a user in exchange for performing the account maintenance action for the first account, and can identify a second number of credits to offer to a user in exchange for performing an account maintenance action associated with the second account. In this example, server(s) 110 may offer more credits to the user performing the account maintenance action for the first account than to the user performing the account maintenance action for the second account, because the risk of fraud associated with the first account is greater than the risk of fraud associated with the second account.

In some embodiments, server(s) 110 may award credits to a user without first prompting the user with an offer to earn credits. For example, a diligent user that updates a password within a certain period of time (e.g., 6 months) may be awarded credits without prompting the user with an offer to earn credits.

In some embodiments, server(s) 110 may present an account maintenance action to a user along with a first number of credits that can be earned for performing the account maintenance action. If the user does not perform the account maintenance action within a certain period of time (e.g., 1 month), server(s) 110 can identify a second number of credits to offer in exchange for performing the account maintenance action. For example, the second number of credits could be greater than the first number of credits as an incentive to get the user to perform the account maintenance action. Alternatively, the second number of credits could be less than the first number of credits to penalize the user for not performing the account maintenance action initially. Server(s) 110 may transmit a second prompt to the user associated with the account offering the second number of credits in exchange for performing the account maintenance action, verify that the user has performed the account maintenance action after transmitting the second prompt, and award the second number of credits to the user in response to verifying that the user has performed the account maintenance action after transmitting the second prompt.

The rules and algorithms implemented in the software on server(s) 110 may employ machine learning and/or neural network techniques for determining which account maintenance actions to incentivize and how many credits to award for each account maintenance action to each user based on a risk model, a marketing model, and/or a customer engagement model of the institution. For example, a machine learning and/or neural network risk model can be trained using historical data regarding different aspects of accounts (e.g., length of time between password updates, length of time between phone number updates) and the fraud risks found to be associated with the different aspects. Once trained in this fashion, the model may be used to determine a risk of fraud associated with account information that has not been updated or verified within a period of time, and to prioritize account maintenance actions for updating or verifying this information. Server(s) 110 implementing such a model may discover, for example, that a telephone number that has not been confirmed or updated within a certain period of time has an associated probability of costing the institution money (e.g., by hindering the institution's ability to contact the user at the phone number). As another example, the model can determine that on average work telephone numbers tend to stay unchanged for a period of 6 months, that home telephone numbers tend to stay unchanged for a period of a year, and that cell phone numbers tend to stay unchanged for a period of 2 years. The model may then be used to determine that, if a user's work telephone number has not been updated in over 6 months, the user should be prompted to update the telephone number as an account maintenance action. As another example, the model may discover that passwords over three months old are 25% more likely to be hacked, and that passwords over a year old are 75% more likely to be hacked. The model may then be used to, for example, offer credits for changing a password in either case, but to offer more credits if the password is over a year old than if the password is over three months old but less than a year old. Similarly, a machine learning and/or neural network customer engagement model may be trained using historical data regarding different aspects of accounts (e.g., whether a customer appears to be satisfied or unsatisfied with the service provided by the institution, whether a customer regularly engages with the institution's online platform) and various account maintenance actions (e.g., answering a survey question, confirming or updating income of a holder of the account, confirming or updating information about a holder of the account, confirming or updating contact information for the account, confirming or flagging transactions associated with the account) may be prioritized based on the account aspects. A machine learning and/or neural network marketing model may also be trained using historical data regarding different aspects of accounts (e.g., whether marketing opportunities exist with certain types of accounts) to determine whether to prioritize certain account maintenance actions (e.g., uploading images of receipts) that would help the institution in marketing products to a customer associated with the account.

In some embodiments, an institution might buy subscription-based rewards in bulk and offer users monthly subscriptions if they perform a series of account maintenance actions on a regular basis. For example, a user might be given a monthly subscription to a streaming video service. Every period (e.g., month), the user may be presented with a list of account maintenance actions to perform in order to earn the next month of service. For example, an indication may be displayed to a user on a client device indicating that a first list of account maintenance actions will be available for a period of time and that the user can earn a membership to a subscription by completing a portion of the account maintenance actions. Server(s) 110 may award the membership to the subscription to the user in response to verifying that the user has completed the portion of the account maintenance actions. Server(s) 110 can cause a second list of account maintenance actions that can be performed by the user and a number of credits that can be earned in association with each of the account maintenance actions in the second list, to be displayed to the user on the client device. Server(s) 110 can cause an indication to be displayed to the user on the device that the second list of account maintenance actions will be available for a period of time and that the user can maintain the membership to the subscription by performing a portion of the account maintenance actions in the second list of account maintenance actions.

Figure 7:
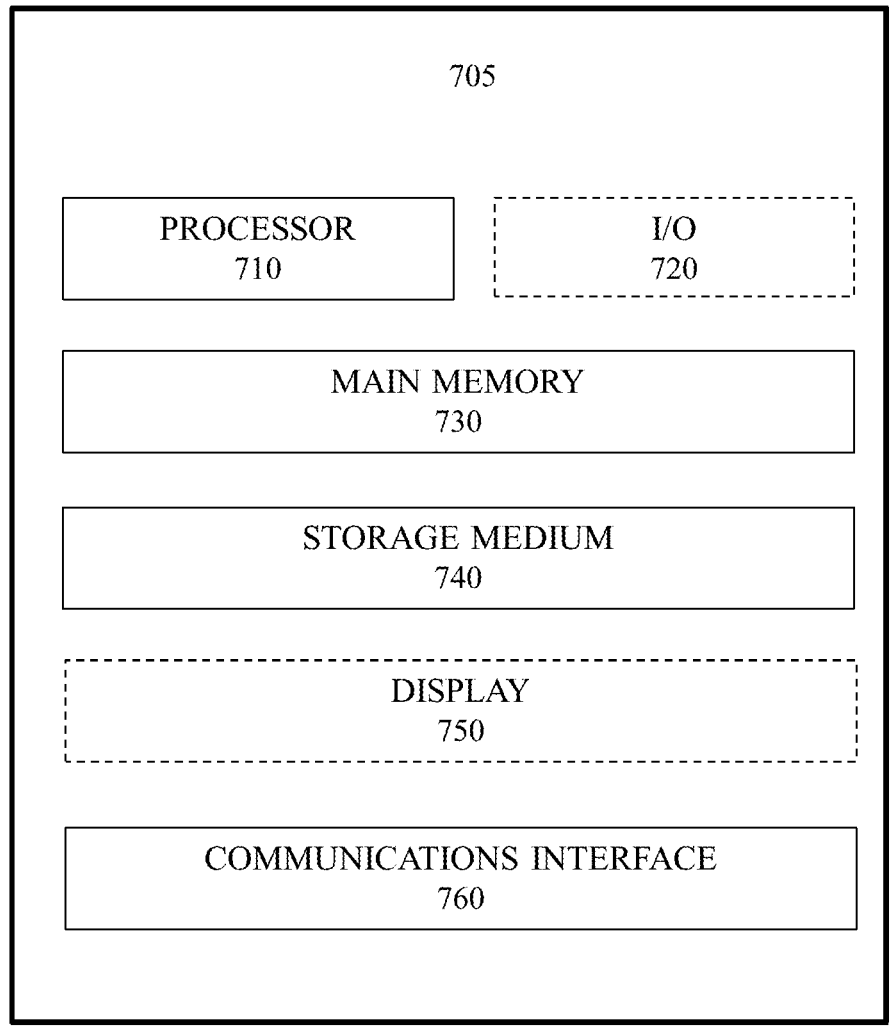
FIG. 7 is an example block diagram of a computer system, consistent with embodiments of the present disclosure.

FIG. 7 illustrates an example computer system 700 for implementing embodiments and features consistent with the present disclosure. Computer system 700 may include one or more computing devices 705. A computing device may include one or more processors 710 for executing instructions. Processors suitable for the execution of instructions include, by way of example, both general and special purpose microprocessors, and any one or more processors of any kind of digital computer. A computing device 705 may also include one or more input/output (I/O) devices 720. By way of example, I/O devices 720 may include keyboards, scanners, keys, buttons, mice, joysticks, styluses, gesture sensors (e.g., video cameras), motion sensors (e.g., infrared sensors, ultrasound sensors), or voice sensors (e.g., microphones). Keys or buttons may be physical or virtual (e.g., provided on a touch screen interface) or both.

A computing device 705 may include one or more storage devices configured to store data or software instructions, or both, used by processor(s) 710 to perform operations consistent with the disclosed embodiments. For example, a computing device 705 may include main memory 730 configured to store one or more software programs that, when executed by processor(s) 710, cause processor(s) 710 to perform functions or operations consistent with disclosed embodiments. By way of example, main memory 730 may include NOR or NAND flash memory devices, read only memory (ROM) devices, or random access memory (RAM) devices. A computing device 705 may also include one or more storage media 740. By way of example, storage media 740 may include hard drives, solid state drives, tape drives or redundant array of independent disks (RAID) arrays. Although FIG. 7 illustrates only one main memory 730 and one storage medium 740, a computing device 705 may include any number of main memories 730 and storage mediums 740. Further, although FIG. 7 illustrates main memory 730 and storage medium 740 as part of computing device 705, main memory 730, storage medium 740, or both may be located remotely and computing device 705 may be able to access main memory 730, storage medium 740, or both via one or more network(s).

Storage medium 740 may be configured to store data, and may store data received from one or more of server(s) 110, database(s) 140, or client devices 130. The data may take or represent various content or information forms, such as documents, textual content, graphical content, or any combination thereof. The data may further include other data received, stored, or inferred by computer system 700, such as user preference information or any other data used for carrying out embodiments of the present disclosure.

A computing device 705 may also include one or more displays 750. Display(s) 750 may be one or more display panels, which may include, for example, one or more cathode ray tube (CRT) displays, liquid crystal displays (LCDs), plasma displays, light emitting diode (LED) displays, organic light emitting diode (OLED) displays, touch screen type displays, projector displays (e.g., images projected on a screen or surface, holographic images, etc.), field emission displays (FEDs), active matrix displays, vacuum fluorescent (VFR) displays, 3-dimensional (3-D) displays, electronic paper (e-ink) displays, microdisplays, or any combination of the above types of displays.

A computing device 705 may further include one or more communications interfaces 760. Communication interface(s) 760 may allow content, software, data, messages, and other information to be transferred between server(s) 110, database(s), and client devices 130. Examples of communication interface(s) 760 may include modems, network interface cards (e.g., an Ethernet card), communications ports, personal computer memory card international association (PCMCIA) slots and card and antennas. Communication interface(s) 760 may transfer software, content, data, messages, or other information in the form of signals, which may be electronic, electromagnetic, optical, or other types of signals. The signals may be provided to or from communications interface 760 via a communication path (e.g., network(s) 120), which may be implemented using wired, wireless, cable, fiber optic, radio frequency (RF) or other communication channels.

A computer system 710 may have additional or fewer components depending on whether the computer system is a client device 130, server 110, or database 140. For example, a server 110 or database may not have I/O device(s) 720. A server 110 or database 140 may also not have display(s) 750.

The subject matter disclosed herein can be implemented in digital electronic circuitry, or in computer software, firmware, or hardware, including the structural means disclosed in this specification and structural equivalents thereof, or in combination of them. The subject matter described herein can be implemented as one or more computer program products, such as one or more computer programs tangibly embodied in an information carrier (e.g., in a machine readable storage device), or embodied in a propagated signal, for execution by, or to control the operation of, a data processing apparatus (e.g., a programmable processor, a computer, or multiple computers). A computer program (also known as a program software, software application, or code) can be written in any form of programming language including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps and the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of computer programs include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, certain computers might also include, or be operatively coupled to receive data from or transfer data to, or both, one or more mass storage devices for storing data, e.g., magnetic magneto optical disks, or optical disks. Information carriers suitable for embodying computer program instructions and data include all forms of nonvolatile memory, including by way of example semiconductor memory devices (e.g., EPROM, EEPROM, and flash memory devices), magnetic disks (e.g., internal hard disks or removable disks), magneto optical disks, and optical disk (e.g., CD and DVD disks). The processor and memory can be supplemented by, or incorporated in, special purpose logic circuitry.

To provide interaction with a user, some subject matter described herein can be implemented on a computer having a display device, e.g., a CRT (cathode ray tube) or LCD (liquid crystal display) monitor, for displaying information to the user, and a keyboard and a pointing device (e.g., a mouse, trackball, touchscreen), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Some subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter disclosed herein), or a combination of such back end, middleware, and front end components. The components of the system can be interconnected by any form of medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computer-implemented method for incentivizing user behavior, comprising:
    retrieving, by a computer system comprising a processor, information for an online account of a user from a database comprising information for a plurality of online accounts, wherein information comprises at least one of:
        financial information for the online account;
        contact information for the online account;
        bank account information for the online account;
        account security information; and
        lengths of time between performance, by the user, of previous account maintenance actions;
    determining, by the computer system, a likelihood of reducing a risk of fraud associated with the online account that would result from performance by the user of each of a plurality of account maintenances actions by analyzing the information for the online account with a machine learning model, wherein the machine learning model is trained using historical instances of known fraud and lengths of time between account maintenance actions being performed associated with and leading up to the historical instances;
    determining, by the computer system, an account maintenance action with a highest likelihood of reducing the risk of fraud associated with the online account that would result from performance of the account maintenance action by the user;
    identifying, by the machine learning model, a number of credits that can be earned by the user for performing the account maintenance action, wherein the number of credits is based on the likelihood of reducing the risk of fraud;
    displaying, by the computer system, an indication to a user interface associated with the user identifying the account maintenance action and the number of credits that can be earned by the user for performing the account maintenance action;
    verifying, by the computer system, that the user has performed the account maintenance action by querying the database to retrieve records associated with the online account and determining that information in the records associated with the account maintenance action has been added or changed by the user; and
    awarding, by the computer system, the number of credits to the online account in response to verifying that the user has performed the account maintenance action.

2. The computer-implemented method of claim 1, wherein the account maintenance action is one of:
    confirming or updating contact information for the online account;
    confirming or updating information about a holder of the online account;
    confirming or updating income of a holder of the online account;
    confirming a transaction associated with the online account;
    flagging a transaction associated with the online account as inaccurate;
    uploading an image of a receipt of a transaction associated with the online account;
    creating or updating a password;
    linking the online account to a social network account; or
    authorizing automatic payment of balances on the online account.

3. The computer-implemented method of claim 1, wherein the credits are indicative of one of:
    cash; and
    points that the user is able to redeem for products, services, or gift cards.

4. The computer-implemented method of claim 1, wherein the account maintenance action includes uploading a receipt of a transaction associated with the online account, further comprising: performing, by the computer system, optical character recognition on the receipt to identify individual items and individual item costs making up a transaction; and
    storing, by the computer system, information about the individual items and the individual item costs in association with the transaction.

5. The computer-implemented method of claim 1, further comprising:
    determining, by the computer system, that a password associated with the online account is insecure; and
    identifying, by the computer system, an action to update the password to a more secure password as the account maintenance action in response to the determination that the password associated with the online account is insecure.

6. The computer-implemented method of claim 1, further comprising:
   determining, by the computer system, that the user has not been engaged regarding the online account using stored contact information for the user for a period of time; and
   identifying, by the computer system, an action to confirm the contact information as the account maintenance action in response to the determination.

7. The computer-implemented method of claim 1, wherein the indication of the account maintenance action is provided by one of email, push notification, text message, or prompt on a screen displaying account information.

8. The computer-implemented method of claim 1, wherein the online account includes one of:
   a savings account;
   a credit card account;
   a checking account;
   an investment account; or
   a loan account.

9. The computer-implemented method of claim 1, wherein the credits are indicative of points that the user is able to redeem for a membership to a subscription-based service.

10. A system for incentivizing user behavior, comprising:
    a memory storing instructions; and
    a processor that, when executing the instructions, is configured to:
    determine, by a machine learning model, a likelihood of reducing a risk of fraud associated with an online account associated with a user that would result from performance by the user of each of a plurality of account maintenance actions, wherein the machine learning model is trained using historical instances of known fraud and lengths of time between account maintenance actions being performed associated with and leading up to the instances;
    determine, by the machine learning model, an account maintenance action with a highest likelihood of reducing the risk of fraud associated with the online account that would result from performance of the account maintenance action by the user;
    identify, by the machine learning model, a number of credits to offer to the user in exchange for performing the account maintenance action for the online account, wherein the number of credits is based on the likelihood of reducing the risk of fraud;
    transmit a prompt to a user interface on a device associated with the user associated with the online account offering the number of credits in exchange for performing the account maintenance action;
    verify that the user has performed the account maintenance action by querying a database to retrieve records associated with the online account and determining that information in the records associated with the account maintenance action has been added or changed by the user; and
    award the number of credits to the online account in response to verifying that the user has performed the account maintenance action.

11. The system of claim 10, wherein the number of credits that are offered in exchange for performing the account maintenance action is identified based on a value of the online account to an institution providing the online account.

12. The system of claim 10, wherein the online account is a first online account, and the processor is further configured to:
    retrieve information indicative of a risk of fraud associated with each of the first online account and a second online account, the risk of fraud associated with the first online account being greater than the risk of fraud associated with the second online account;
    identify the account maintenance action that can be performed for the first online account by determining that performance of the account maintenance action would reduce the risk of fraud associated with the first online account;
    identify the account maintenance action as an account maintenance action that can be performed for the second online account by determining that performance of the account maintenance action would reduce the risk of fraud associated with the second online account;
    identify a first number of credits to offer in exchange for performing the account maintenance action for the first online account based on the risk of fraud associated with the first online account; and
    identify a second number of credits to offer in exchange for performing the account maintenance action for the second online account based on the risk of fraud associated with the second online account, wherein the first number of credits is greater than the second number of credits as a result of the risk of fraud associated with the first online account being greater than the risk of fraud associated with the second online account.

13. The system of claim 10, wherein the prompt is a first prompt, the number of credits is a first number of credits, and the processor is further configured to:
    identify that the account maintenance action has not been performed for the online account after transmitting the first prompt to the user associated with the online account;
    identify a second number of credits to offer in exchange for performing the account maintenance action for the online account, the second number of credits being different than the first number of credits;
    transmit a second prompt to the user associated with the online account offering the second number of credits in exchange for performing the account maintenance action;
    verify that the user has performed the account maintenance action after transmitting the second prompt; and
    award the second number of credits to the user in response to verifying that the user has performed the account maintenance action after transmitting the second prompt.

14. The system of claim 10, wherein the credits are indicative of points that the user is able to redeem for a membership to a subscription-based service.

15. A computer-implemented method for incentivizing user behavior, comprising:
    causing, by a computer system comprising a processor, information associated with an online account and a first indicator that credits can be earned for performing account maintenance actions associated with the online account, to be displayed to a user on a device;
    causing, by the computer system, a second indicator to be displayed to the user on the device indicating that a list of account maintenance actions will be available for a period of time and that the user can earn a membership to a subscription by completing at least a portion of the list of account maintenance actions;

identifying, by a machine learning model trained using historical instances of known fraud and lengths of time between account maintenance actions being performed associated with a leading up to the historical instances, one or more account maintenance actions for the user to perform based on information associated with the online account;

determining, by the machine learning model, a likelihood of reducing a risk of fraud associated with the online account that would result from performance by the user of each of the identified one or more account maintenance actions;

identifying, by the machine learning model, a number of credits to award for performing each of the identified one or more account maintenance actions, wherein the number of credits is based on the likelihood of reducing the risk of fraud;

causing, by the computer system, the list of the account maintenance actions that can be performed by the user and the number of credits that can be earned in association with each of the account maintenance actions, to be displayed to the user on the device, the list comprising the one or more account maintenance actions identified by the machine learning model;

receiving, by the computer system, a notification that the user has selected one of the one or more account maintenance actions identified by the machine learning model;

verifying, by the computer system, that the user has performed the selected account maintenance action by querying a database to retrieve records associated with the online account and determining that information in the records associated with the selected account maintenance action has been added or changed by the user;

adding, by the computer system, the number of credits associated with the performed account maintenance action to a sum total number of credits the user has earned; and awarding, by the computer system, the membership to the subscription to the user in response to verifying that the user has completed the selected account maintenance action.

16. The computer-implemented method of claim 15 comprising providing, by the computer system, information that causes a graphic to be displayed to the user on the device, the graphic indicating the sum total number of credits the user has earned.

17. The computer-implemented method of claim 16, wherein the graphic grows in size as the sum total number of credits the user has earned increases, wherein the graphic indicates progress toward a goal the user is working towards, the graphic being partially filled based on the sum total number of credits the user has earned.

18. The computer-implemented method of claim 15, wherein the list of account maintenance actions is a first list of account maintenance actions, further comprising:

causing, by the computer system, a second list of account maintenance actions that can be performed by the user and a number of credits that can be earned in association with each of the account maintenance actions in the second list, to be displayed to the user on the device after the period of time has passed; and causing, by the computer system, a third indicator to be displayed to the user on the device indicating that the second list of account maintenance actions will be available for a period of time and that the user can maintain the membership to the subscription by performing a portion of the account maintenance actions in the second list of account maintenance actions.

19. The computer-implemented method of claim 15, further comprising causing, by the computer system, a prompt to be sent to the user, the prompt indicating that a new account maintenance action is available for performance by the user.

20. The computer-implemented method of claim 19, wherein the prompt is one of an email message, text message, push notification, telephone call, or message within an application associated with an institution providing the online account.

* * * * *